(12) United States Patent
Shim

(10) Patent No.: US 8,608,913 B2
(45) Date of Patent: Dec. 17, 2013

(54) METHOD AND APPARATUS FOR PROVIDING ELECTROCHEMICAL CORROSION PROTECTION

(75) Inventor: Winston W. Shim, Ontario (CA)

(73) Assignee: Corrosion Service Company Limited, Ontario (CA)

( * ) Notice: Subject to any disclaimer, the term of this patent is extended or adjusted under 35 U.S.C. 154(b) by 73 days.

(21) Appl. No.: 13/118,731

(22) Filed: May 31, 2011

(65) Prior Publication Data

US 2011/0290665 A1    Dec. 1, 2011

Related U.S. Application Data

(60) Provisional application No. 61/349,951, filed on May 31, 2010, provisional application No. 61/450,476, filed on Mar. 8, 2011.

(30) Foreign Application Priority Data

May 31, 2010 (CA) .................................. 2706215

(51) Int. Cl.
*C23F 13/06* (2006.01)
*C23F 13/22* (2006.01)

(52) U.S. Cl.
USPC ............... 204/196.37; 204/196.1; 204/196.2; 204/196.21; 204/196.33; 205/726; 205/727; 205/730; 205/740

(58) Field of Classification Search
USPC ............... 204/196.1, 196.2, 196.21, 196.33, 204/196.37; 205/726, 727, 730, 740
See application file for complete search history.

(56) References Cited

U.S. PATENT DOCUMENTS

| | | | |
|---|---|---|---|
| 3,182,007 A | 5/1965 | Hutchlson et al. |
| 3,379,629 A | 4/1968 | Banks et al. |
| 3,425,921 A | 2/1969 | Sudrabin |
| 3,691,040 A | 9/1972 | Sudrabin et al. |
| 3,714,004 A | 1/1973 | Riggs, Jr. et al. |

(Continued)

FOREIGN PATENT DOCUMENTS

| | | |
|---|---|---|
| CA | 2141127 A | 7/1996 |
| CA | 2606671 A1 | 4/2009 |

(Continued)

OTHER PUBLICATIONS

European Search Report and Citations under Section 17 in corresponding Great Britain Application No. GB1109189.9 mailed Oct. 6, 2011 (5 pages).

(Continued)

*Primary Examiner* — Bruce Bell
(74) *Attorney, Agent, or Firm* — Myers Bigel Sibley & Sajovec, P.A.

(57) ABSTRACT

An apparatus for providing electrochemical corrosion protection to a process vessel, the apparatus comprises at least one anode in communication with the process vessel; a DC current supply being electrically coupled to the process vessel and to the at least one anode; and a potential control unit in communication with the DC current supply. The potential control unit is electrically coupled to the process vessel and to a reference electrode in communication with the process vessel. The current supplied by the DC current supply for passivating the process vessel is adjustable by the potential control unit. The process vessel may comprise at least one of duplex stainless steel and superaustenitic stainless steel.

33 Claims, 7 Drawing Sheets

(56) References Cited

U.S. PATENT DOCUMENTS

| | | | |
|---|---|---|---|
| 4,152,236 | A | 5/1979 | Beese et al. |
| 4,285,787 | A | 8/1981 | Garner et al. |
| 4,342,634 | A | 8/1982 | Haasl et al. |
| 4,537,039 | A | 8/1985 | Fearon |
| H544 | H | 11/1988 | Castillo et al. |
| 4,936,969 | A | 6/1990 | Garlinger |
| 5,028,396 | A * | 7/1991 | Jones et al. ............ 422/161 |
| 5,032,373 | A * | 7/1991 | Jones et al. ............ 423/522 |
| 5,290,407 | A | 3/1994 | Syrett et al. |
| 5,340,455 | A | 8/1994 | Kroon et al. |
| 5,577,083 | A | 11/1996 | Terhune et al. |
| 6,506,295 | B1 | 1/2003 | Takahashi et al. |
| 6,540,886 | B1 | 4/2003 | Russell |
| 7,225,863 | B2 | 6/2007 | Anastasijevic et al. |
| 8,114,266 | B2 * | 2/2012 | Benton ................... 205/657 |
| 2004/0238377 | A1 * | 12/2004 | Boreave ................. 205/740 |
| 2006/0054072 | A1 * | 3/2006 | Sica et al. .............. 114/222 |
| 2009/0065367 | A1 | 3/2009 | Heselmans |

FOREIGN PATENT DOCUMENTS

| | | | |
|---|---|---|---|
| EP | 0574064 | A3 | 12/1993 |
| GB | 1184484 | A | 3/1970 |
| GB | 2474084 | A | 4/2011 |
| JP | 53125241 | A | 11/1978 |
| JP | 59154502 | A | 9/1984 |
| JP | 60190564 | A | 9/1985 |
| JP | 02061080 | A | 3/1990 |
| JP | 2004052096 | A | 2/2004 |
| JP | 2004060042 | A | 2/2004 |
| JP | 2005213634 | A | 8/2005 |
| KR | 2009111484 | A | 10/2009 |
| WO | WO 92/16673 | A1 | 10/1992 |

OTHER PUBLICATIONS

Dille et al., "Cost Savings for Flue Gas Desulfurization Scrubbers and Reaction Tanks by Electrochemical Corrosion Protection," NACE International: The Corrosion Society, AIRPOL Symposium, Aug. 29, 2004, Washington, D.C. (10 pages).

Dille et al., "History of Electrochemical Protection of Flue Gas Desulfurization Reaction Tanks," Corrosion 2000, Paper No. 00580, © 2000 (9 pages).

Shim et al., "Using Electrochemical Protection to Prolong Service Life of Scrubbers and Associated Equipment," Corrosion 98, Paper No. 477, © 1998 (8 pages).

* cited by examiner

METHOD AND APPARATUS FOR PROVIDING ELECTROCHEMICAL CORROSION PROTECTION

STATEMENT OF PRIORITY

This application claims the benefit, under 35 U.S.C. §119 (e), of U.S. Provisional Patent Application No. 61/450,476, filed Mar. 8, 2011, U.S. Provisional Application Pat. No. 61/349,951, filed May 31, 2010 and Canadian Patent Application No. 2,706,215, filed May 31, 2010, the entire contents of which are incorporated by reference herein.

FIELD OF THE INVENTION

The present invention relates generally to corrosion protection and in particular, to an apparatus for providing electrochemical corrosion protection to a process vessel and a method for same.

BACKGROUND OF THE INVENTION

Corrosion of metal structures is a well-understood phenomenon, and occurs when the metal gives up electrons by electrochemical reactions with its surrounding environment. Such corrosion may be prevented by forcing electrons into the metal from an external power source at a rate which is at least just as great as the rate of electrons leaving the metal to participate in the corrosion-causing electrochemical reaction occurring between the metal and its environment.

One commonly used approach to achieve this is impressed current cathodic protection, whereby an electromotive force (EMF) is used to provide electrons directly to the metal structure in its operating environment. This prevents the metal structure from serving as a source of the electrons that would otherwise be required for the corrosion reaction to proceed.

Several approaches for providing impressed current cathodic protection to metal structures fabricated of stainless steel have been described. For example, U.S. Pat. No. 4,152, 236 to Beese et al. is directed to acathodic current from a DC current source applied through a platinum electrode, which provides protection to stainless steel from pitting corrosion particularly in the interior of long narrow stainless steel tubes exposed to hot concentrated chloride brine.

U.S. Pat. No. 4,285,787 to Garner et al. is directed to a method for electrochemical corrosion protection of a partly submersed, rotating, stainless steel drum in a vat containing a corrosive, oxidizing, chloride-containing bleach liquor.

In general, corrosion protection is required in industrial applications. There is,therefore,a need to provide an apparatus and method for providing electrochemical corrosion protection in such applications.

SUMMARY OF THE INVENTION

In another aspect, there is provided an apparatus for providing electrochemical corrosion protection to a stainless steel process vessel, the apparatus comprising:
at least one anode in communication with the process vessel;
a DC current supply being electrically coupled to the process vessel and to the at least one anode; and
a potential control unit in communication with the DC current supply, the potential control unit being electrically coupled to the process vessel and to a reference electrode, the reference electrode being in communication with the process vessel, wherein current supplied by the DC current supply for passivating the process vessel is adjustable by the potential control unit,
wherein the process vessel comprises at least one of duplex stainless steel and superaustenitic stainless steel.

In another aspect, the process vessel consists essentially of at least one of duplex stainless steel and superaustenitic stainless steel.

In another aspect, the process vessel forms part of a scrubber system.

In another aspect, the scrubber system is a flue gas desulphurization scrubber system.

In another aspect, the current adjusts a potential of the process vessel from about −850 mV to about +500 mV relative to the reference electrode.

In another aspect, the current adjusts the potential of the process vessel from about −350 mV to about +400 mV relative to the reference electrode.

In another aspect, said at least one anode comprises a plurality of anodes, wherein said plurality of anodes comprises at least one anode positioned at a first height above a floor of the process vessel and at least one anode positioned at a second height above the floor of the process vessel.

In another aspect, said at least one anode is positioned in an interior of the process vessel and is inclined relative to a wall of the process vessel.

In another aspect, there is provided a method of providing electrochemical corrosion protection to a stainless steel process vessel, the method comprising:
supplying a current from a DC current supply to at least one anode in communication with the process vessel, the DC current supply being electrically coupled to the process vessel, and
adjusting the current supplied by the DC current supply by a potential control unit so as to passivate the process vessel, the potential control unit being electrically coupled to the process vessel and to a reference electrode in communication with the process vessel;
wherein the process vessel comprises at least one of duplex stainless steel and superaustenitic stainless steel.

In another aspect, the process vessel consists essentially of at least one of duplex stainless steel and superaustenitic stainless steel.

In another aspect, the process vessel forms part of a scrubber system.

In another aspect, the current adjusts a potential of the process vessel from about −850 mV to about +500 mV relative to the reference electrode.

In another aspect, the current adjusts the potential of the process vessel from about −350 mV to about +400 mV relative to the reference electrode.

In another aspect, said at least one anode comprises a plurality of anodes, wherein said plurality of anodes comprises at least one anode positioned at a first height above a floor of the process vessel and at least one anode positioned at a second height above the floor of the process vessel.

In another aspect, said at least one anode is positioned in an interior of the process vessel and is inclined relative to a wall of the process vessel.

In another aspect, there is provided a system comprising a stainless steel process vessel; and an electrochemical corrosion protection apparatus providing a passivating current to the stainless steel process vessel;wherein the process vessel comprises at least one of duplex stainless steel and superaustenitic stainless steel.

In another aspect, the process vessel consists essentially of at least one of duplex stainless steel and superaustenitic stainless steel.

In another aspect, at least one of the reference electrode and the at least one anode is positioned in an interior of the process vessel.

In another aspect, the electrochemical corrosion protection apparatus is the apparatus described herein.

In another aspect, the system is a scrubber system.

In another aspect, the scrubber system is a flue gas desulphurization scrubber system.

In another aspect, the apparatus adjusts a potential of the process vessel from about −850 mV to about +500 mV relative to a reference electrode in communication with the process vessel.

In another aspect, the apparatus adjusts the potential of the process vessel from about −350 mV to about +400 mV relative to a reference electrode in communication with the process vessel.

In another aspect, there is provided an apparatus for providing electrochemical corrosion protection to a stainless steel process vessel, the apparatus comprising:

a plurality of anodes, said plurality of anodes comprising at least one anode positioned at a first height above a floor of the process vessel and at least one anode positioned at a second height above the floor of the process vessel;

a DC current supply being electrically coupled to the process vessel and to said plurality of anodes; and a potential control unit in communication with the DC current supply, the potential control unit being electrically coupled to the process vessel and to a reference electrode, the reference electrode being in communication with the process vessel, wherein current supplied by the DC current supply for passivating the process vessel is adjustable by the potential control unit, wherein the process vessel comprises at least one of duplex stainless steel and superaustenitic stainless steel.

In accordance with another aspect, the process vessel consists essentially of at least one of duplex stainless steel and superaustenitic stainless steel.

In accordance with another aspect, the reference electrode is positioned in an interior of the process vessel.

In accordance with another aspect, the process vessel forms part of a scrubber system.

In accordance with another aspect, the scrubber system is a flue gas desulphurization scrubber system.

In accordance with another aspect, the process vessel is a scrubber vessel.

In accordance with another aspect, the process vessel is a reaction tank.

In accordance with another aspect, at least one of said plurality of anodes is suspended from a structure available in the vessel that is capable of supporting one or more of said plurality of anodes.

In accordance with another aspect, the current adjusts a potential of the process vessel from about −850 mV to about +500 mV relative to the reference electrode.

In accordance with another aspect, the current adjusts the potential of the process vessel from about −350 mV to about +400 mV relative to the reference electrode.

In accordance with another aspect, there is provided a use of the apparatus for providing electrochemical corrosion protection to the process vessel.

In accordance with another aspect, there is provided a method of providing electrochemical corrosion protection to a stainless steel process vessel, the method comprising:

supplying a current from a DC current supply to a plurality of anodes in communication with the process vessel, the DC current supply being electrically coupled to the process vessel, and adjusting the current supplied by the DC current supply by a potential control unit so as to passivate the process vessel, the potential control unit being electrically coupled to the process vessel and to a reference electrode in communication with the process vessel, wherein the plurality of anodes comprises at least one anode positioned at a first height above a floor of the process vessel, and at least one anode positioned at a second height above the floor of the process vessel, and wherein the process vessel comprises at least one of duplex stainless steel and superaustenitic stainless steel.

In accordance with another aspect, the process vessel consists essentially of at least one of duplex stainless steel and superaustenitic stainless steel.

In accordance with another aspect, at least one of the reference electrode and the plurality of anodes are positioned in an interior of the process vessel.

In accordance with another aspect, the process vessel forms part of a scrubber system.

In accordance with another aspect, the scrubber system is a flue gas desulphurization scrubber system.

In accordance with another aspect, the process vessel is a scrubber vessel.

In accordance with another aspect, the process vessel is a reaction tank.

In accordance with another aspect, at least one of said plurality of anodes is suspended from a structure available in the vessel that is capable of supporting one or more of said plurality of anodes.

In accordance with another aspect, the current adjusts a potential of the process vessel from about −850 mV to about +500 mV relative to the reference electrode.

In accordance with another aspect, the current adjusts the potential of the process vessel from about −350 mV to about +400 mV relative to the reference electrode.

In accordance with another aspect, there is provided an apparatus for providing electrochemical corrosion protection to a stainless steel process vessel, the apparatus comprising:

at least one anode positioned in an interior of the process vessel and being inclined relative to a wall of the process vessel;

a DC current supply being electrically coupled to the process vessel and to the at least one anode; and a potential control unit in communication with the DC current supply, the potential control unit being electrically coupled to the process vessel and to a reference electrode in communication with the process vessel, wherein current supplied by the DC current supply for passivating the process vessel is adjustable by the potential control unit, wherein the process vessel comprises at least one of duplex stainless steel and superaustenitic stainless steel.

In accordance with another aspect, the process vessel consists essentially of at least one of duplex stainless steel and superaustenitic stainless steel.

In accordance with another aspect, said at least one anode has an inclination angle of about 0 degrees relative to said wall.

In accordance with another aspect, the process vessel forms part of a scrubber system.

In accordance with another aspect, the scrubber system is a flue gas desulphurization scrubber system.

In accordance with another aspect, the process vessel is a scrubber vessel.

In accordance with another aspect, the process vessel is a reaction tank.

In accordance with another aspect, at least one of said at least one anode is suspended from a structure available in the vessel that is capable of supporting one or more of said at least one anode.

In accordance with another aspect, the current adjusts a potential of the process vessel from about −850 mV to about +500 mV relative to the reference electrode.

In accordance with another aspect, the current adjusts the potential of the process vessel from about −350 mV to about +400 mV relative to the reference electrode.

In accordance with another aspect, said at least one anode is elongate in shape.

In accordance with another aspect, said at least one anode comprises a plurality of anodes.

In accordance with another aspect, there is provided a use of the apparatus for providing electrochemical corrosion protection to the process vessel.

In accordance with another aspect, there is provided a method of providing electrochemical corrosion protection to a stainless steel process vessel, the method comprising:

supplying a current from a DC current supply to at least one anode in communication with the process vessel, the DC current supply being electrically coupled to the process vessel, and adjusting the current supplied by the DC current supply by a potential control unit so as to passivate the process vessel, the potential control unit being electrically coupled to the process vessel and to a reference electrode in communication with the process vessel, wherein at least one of said at least one anode being inclined relative to a wall of the process vessel, and wherein the process vessel comprises at least one of duplex stainless steel and superaustenitic stainless steel.

In accordance with another aspect, the process vessel consists essentially of at least one of duplex stainless steel and superaustenitic stainless steel.

In accordance with another aspect, at least one of the reference electrode and the at least one anode is positioned in an interior of the process vessel.

In accordance with another aspect, the process vessel forms part of a scrubber system.

In accordance with another aspect, the scrubber system is a flue gas desulphurization scrubber system.

In accordance with another aspect, the process vessel is a scrubber vessel.

In accordance with another aspect, the process vessel is a reaction tank.

In accordance with another aspect, each of said at least one anode is suspended from a structure available in the vessel that is capable of supporting said at least one of said at least one anode.

In accordance with another aspect, the current adjusts a potential of the process vessel from about −850 mV to about +500 mV relative to the reference electrode.

In accordance with another aspect, the current adjusts the potential of the process vessel from about −350 mV to about +400 mV relative to the reference electrode.

In accordance with another aspect, there is provided an apparatus for providing electrochemical corrosion protection to a process vessel, the apparatus comprising:

at least one anode in communication with the process vessel, the at least one anode comprising a first portion and a second portion, the second portion being coupled to the first portion;

a DC current supply being electrically coupled to the process vessel and to the at least one anode; and a potential control unit in communication with the DC current supply, the potential control unit being electrically coupled to the process vessel and to a reference electrode in communication with the process vessel, wherein current supplied by the DC current supply for passivating the process vessel is adjustable by the potential control unit.

In accordance with another aspect, the process vessel comprises at least one of duplex stainless steel and superaustenitic stainless steel.

In accordance with another aspect, the process vessel consists essentially of at least one of duplex stainless steel and superaustenitic stainless steel.

In accordance with another aspect, the first portion is integral with the second portion.

In accordance with another aspect, the second portion is non-collinear with the first portion.

In accordance with another aspect, the second portion forms an angle of about 90 degrees with respect to the first portion.

In accordance with another aspect, at least one of the reference electrode and the at least one anode is positioned in an interior of the process vessel.

In accordance with another aspect, the process vessel forms part of a scrubber system.

In accordance with another aspect, the scrubber system is a flue gas desulphurization scrubber system.

In accordance with another aspect, the process vessel is a scrubber vessel.

In accordance with another aspect, the process vessel is a reaction tank.

In accordance with another aspect, at least one of said at least one anode is suspended from a structure available in the vessel that is capable of supporting one or more of said at least one anode.

In accordance with another aspect, the current adjusts a potential of the process vessel from about −850 mV to about +500 mV relative to the reference electrode.

In accordance with another aspect, the current adjusts the potential of the process vessel from about −350 mV to about +400 mV relative to the reference electrode.

In accordance with another aspect, said at least one anode comprises a plurality of anodes, said plurality comprising at least one anode positioned at a first height above a floor of the process vessel and at least one anode positioned at a second height above the floor of the process vessel.

In accordance with another aspect, there is provided the use of the apparatus for providing electrochemical corrosion protection to the process vessel.

In accordance with another aspect, there is provided a method of providing electrochemical corrosion protection to a process vessel, the method comprising:

supplying a current from a DC current supply to at least one anode in communication with the process vessel, the DC current supply being electrically coupled to the process vessel, and adjusting the current supplied by the DC current supply by a potential control unit so as to passivate the process vessel, the potential control unit being electrically coupled to the process vessel and to a reference electrode in communication with the process vessel, wherein at least one of said at least one anode comprises a first portion and a second portion, the second portion being coupled to the first portion.

In accordance with another aspect, the process vessel comprises at least one of duplex stainless steel and superaustenitic stainless steel.

In accordance with another aspect, the process vessel consists essentially of at least one of duplex stainless steel and superaustenitic stainless steel.

In accordance with another aspect, the first portion is integral with the second portion.

In accordance with another aspect, the second portion is non-collinear with the first portion.

In accordance with another aspect, the second portion forms an angle of about 90 degrees with respect to the first portion.

In accordance with another aspect, at least one of the reference electrode and the at least one anode is positioned in an interior of the process vessel.

In accordance with another aspect, the process vessel forms part of a scrubber system.

In accordance with another aspect, the scrubber system is a flue gas desulphurization scrubber system.

In accordance with another aspect, the process vessel is a scrubber vessel.

In accordance with another aspect, the process vessel is a reaction tank.

In accordance with another aspect, at least one of said at least one anode is suspended from a structure available in the vessel that is capable of supporting one or more of said at least one anode.

In accordance with another aspect, the current adjusts a potential of the process vessel from about −850 mV to about +500 mV relative to the reference electrode.

In accordance with another aspect, the current adjusts the potential of the process vessel from about −350 mV to about +400 mV relative to the reference electrode.

In accordance with another aspect, said at least one anode comprises a plurality of anodes, said plurality comprising at least one anode positioned at a first height above a floor of the process vessel and at least anode positioned at a second height above the floor of the process vessel.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from the detailed description.

BRIEF DESCRIPTION OF THE DRAWINGS

Embodiments will now be described more fully with reference to the accompanying drawings in which.

DETAILED DESCRIPTION OF THE EMBODIMENTS

The following is directed to an apparatus and method for providing electrochemical corrosion protection to a process vessel.

In certain embodiments, the apparatus and method provide electrochemical corrosion protection to a stainless steel process vessel, wherein the stainless steel process vessel comprises at least one of superaustenitic stainless steel and duplex stainless steel.

Figure 1:
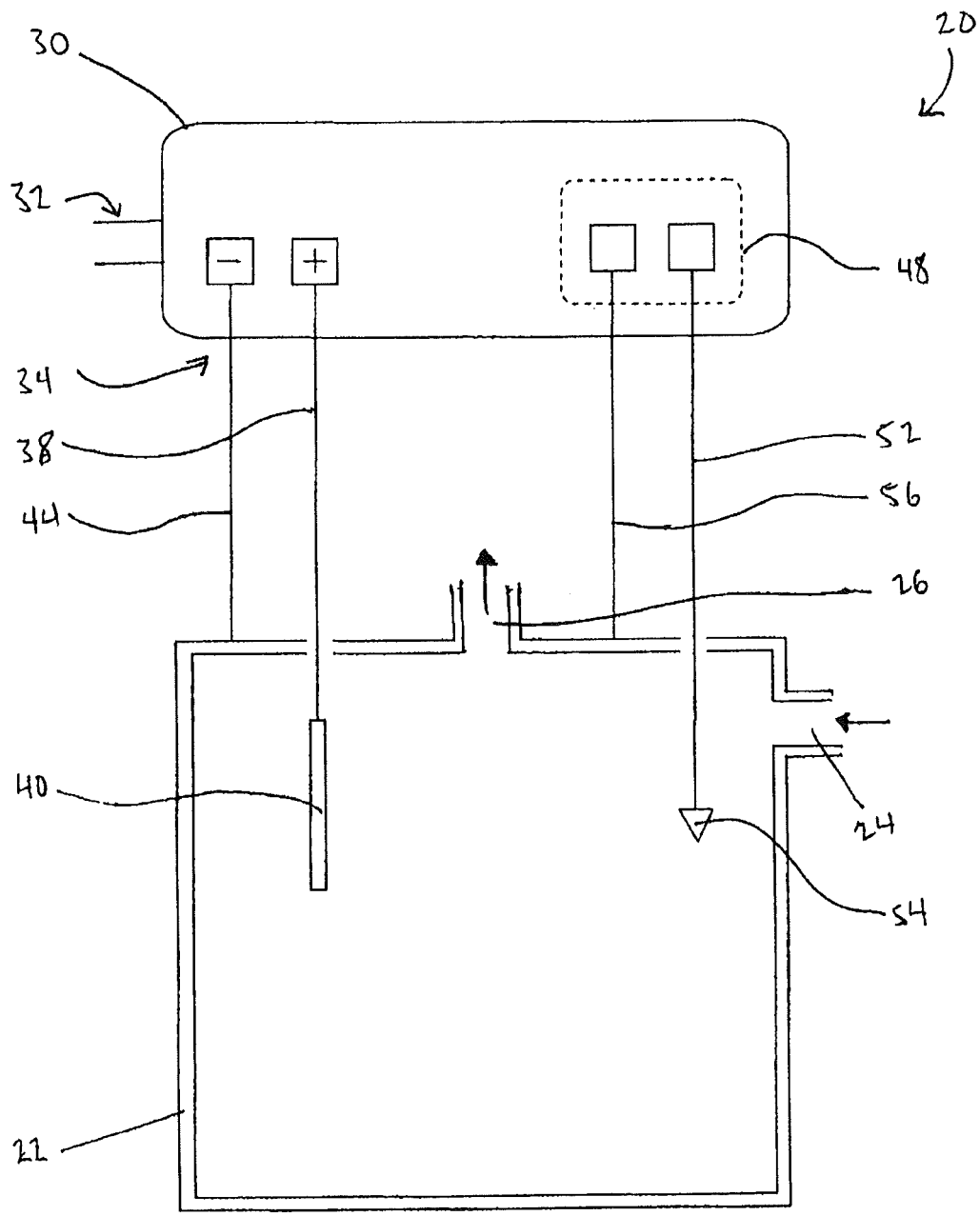
FIG. 1 is a schematic side view of an electrochemical corrosion protection apparatus.

Turning now to FIG. 1, an apparatus for providing electrochemical corrosion protection is shown, and is generally indicated using reference numeral 20. The apparatus 20 is configured to provide electrochemical corrosion protection to a stainless steel process vessel 22 which, in this embodiment, is a scrubber vessel. However, it will be understood that the apparatus 20 is not limited to use with scrubber vessels, and alternatively may be used to provide electrochemical corrosion protection to any process vessel, such as, and without being limited thereto, a fluid tank, a reactor, a reaction tank, a pipe, a pipeline, and the like.

The process vessel 22 is generally hollow, and has an interior in which process fluids are enclosed. The process vessel 22 has an input 24 through which the process fluids enter the process vessel 22, and an output 26 through which the process fluids exit the process vessel 22. As will be understood, the positions of input 24 and output 26 are not limited to those illustrated, and may alternatively be positioned differently. In this embodiment, the process vessel 22 is a scrubber vessel forming part of a flue gas desulphurization scrubber system, and the process fluids are flue gases that are produced during combustion of fossil fuel in an industrial facility, such as a coal burning power plant. Here, the flue gases are flowed continuously through the process vessel 22 via the input 24 and the output 26 for removal of sulphur dioxide ($SO_2$) gas by a scrubbing process. Under normal operating conditions of the scrubber, $SO_2$ gas and halogens such as fluorides and chlorides react to form acids, and thereby contribute to a corrosive environment in the interior of the scrubber vessel.

Moreover, in this embodiment, the stainless steel process vessel 22 is a scrubber vessel fabricated of a duplex stainless steel. As is known in the art, duplex stainless steels have a generally mixed microstructure consisting of both austenite and ferrite. This microstructure gives rise to both higher strength and generally improved resistance to localized corrosion, particularly pitting, crevice corrosion and stress corrosion cracking, as compared to austenitic stainless steels. One commonly used duplex stainless steel is alloyed with 22% chromium, and hasUnified Numbering System (UNS) designation of S31803/S32205 and is commonly known as 2205 stainless steel. However, other grades of duplex stainless steels are available.

Turning now to the electrochemical corrosion protection apparatus, the apparatus 20 comprises a DC power supply 30 that has an AC input 32 and a DC output 34. The DC output 34 is electrically coupled via an anode line 38 to an anode 40, which is positioned in the interior of the stainless steel process vessel 22, and is electrically isolated from the stainless steel process vessel 22. The DC output 34 is also electrically coupled via a current return line 44 to the stainless steel process vessel 22. The DC power supply 30 is in communication with a potential control unit 48. The potential control unit 48 is electrically coupled via a reference electrode line 52 to a reference electrode 54 positioned within an interior of the stainless steel process vessel 22, and is electrically isolated from the stainless steel process vessel 22. The reference electrode 54 is a Ag/AgCl reference electrode, however other electrode types may alternatively be used. The potential control unit 48 is also electrically coupled to the stainless steel process vessel 22 via a reference line 56. The potential control unit 48 has a user input that allows a user to enter a target value of potential that is to be assumed by the electrochemical system formed by the reference electrode 54, the process fluids, and the stainless steel process vessel 22. As will be understood by those skilled in the art, the potential control unit 48 is configured to measure the electrochemical potential of this electrochemical system, and to adjust the current supplied by the DC power supply 30 based on this measurement and in accordance with the target value of potential.

In use, the DC power supply 30 applies a DC current so as to bring the stainless steel process vessel 22 to a passivation potential. The passivation potential lies within a passivation zone of the polarization curve of a metal or metal alloy, where the passivation zone is a range of potential in which corrosion of the metal or metal alloy occurs at a generally insignificant or tolerable rate. In this embodiment, the passivation zone of the duplex stainless steel used to fabricate the stainless steel process vessel 22 ranges from about −850 mV to about +500 mV, with respect to the Ag/AgCl reference electrode 54. Accordingly, by using a target value of potential that lies within this passivation zone, the DC power supply 30 of the apparatus 20 supplies a passivating current to the stainless steel process vessel 22, and thereby passivates the stainless steel process vessel 22.

As will be understood, the specific passivation potential used may depend on a number of factors, such as the composition of the stainless steel process vessel, the geometry and the position of the anode relative to the stainless steel process vessel, and the conditions to which the stainless steel process vessel is exposed so as to reduce corrosion. Typically, for a stainless steel process vessel used in a scrubbing process, the value of passivation potential applied may range from about −350 mV to about +400 mV.

In absence of such an application of passivating current from the DC power supply 30, the electrochemical system formed by the reference electrode 54, the process fluids, and the stainless steel process vessel 22 will otherwise assume a potential that occurs during normal scrubbing operations, and which lies above the passivation zone and within a zone of pitting corrosion. As is known in the art, pitting corrosion results in general mechanical deterioration of the duplex stainless steel over time, and will eventually cause mechanical failure of the stainless steel process vessel 22. Such mechanical failure eventually requires the repair or replacement of the stainless steel process vessel 22, which may in turn result in costly downtime. In contrast, application of a passivating current by the apparatus 20 to the stainless steel process vessel 22 advantageously reduces pitting corrosion to an insignificant or tolerable level, and thereby prolongs the lifetime of the stainless steel process vessel 22.

Figure 2:
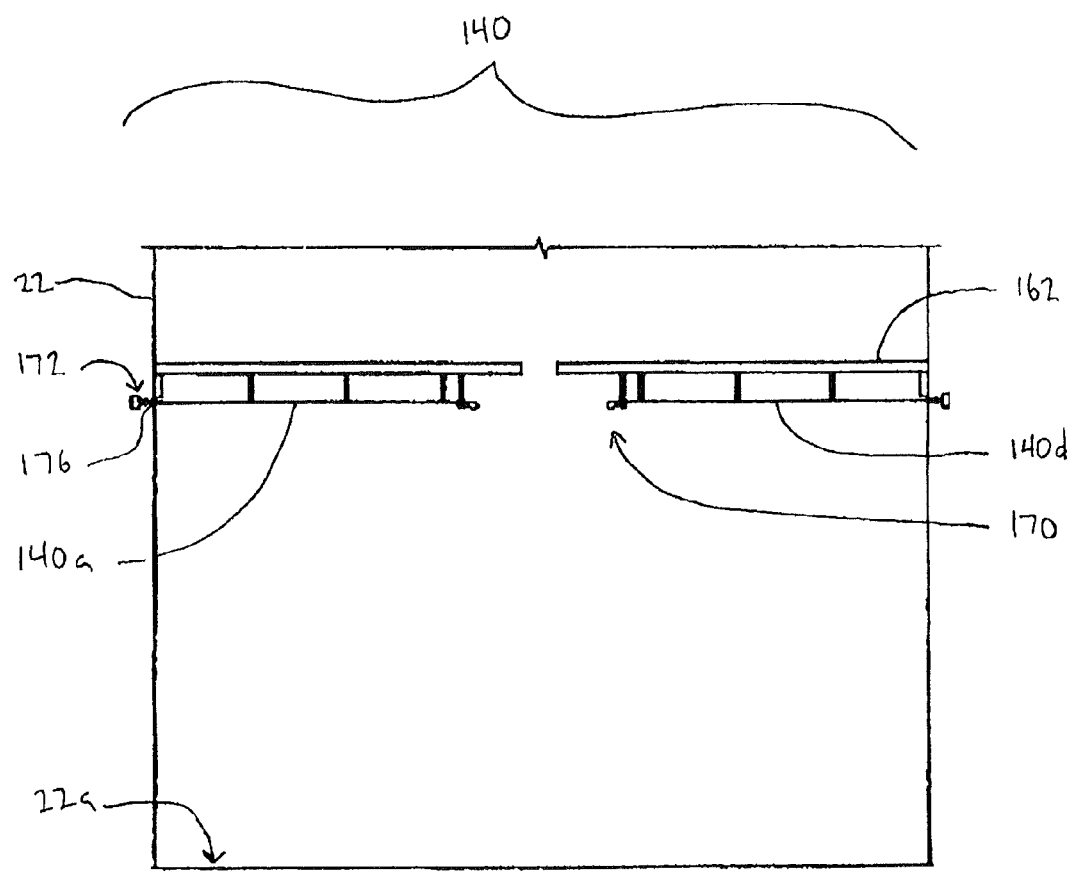
FIG. 2 is a side view of an embodiment of an anode arrangement for use with the apparatus of FIG. 1.
Figure 3:
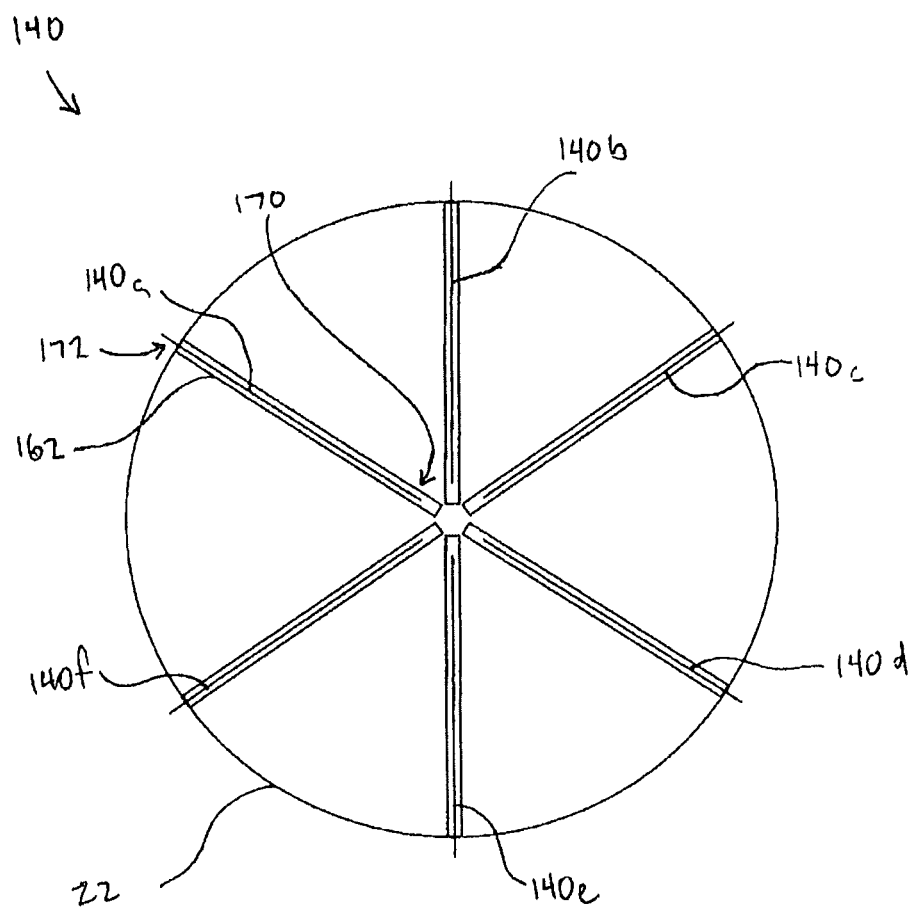
FIG. 3 is a bottom plan view of the anode arrangement of FIG. 2.
Figure 4A:
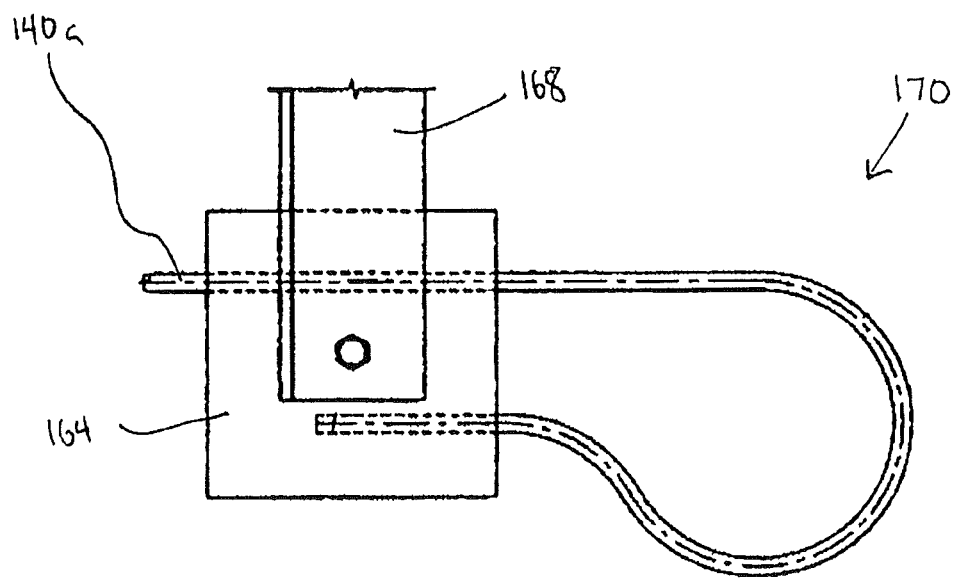
FIGS. 4a and 4b are a side elevation view and a front cross-sectional view, respectively, of a first end of an anode in the arrangement of FIG. 2.
Figure 4B:
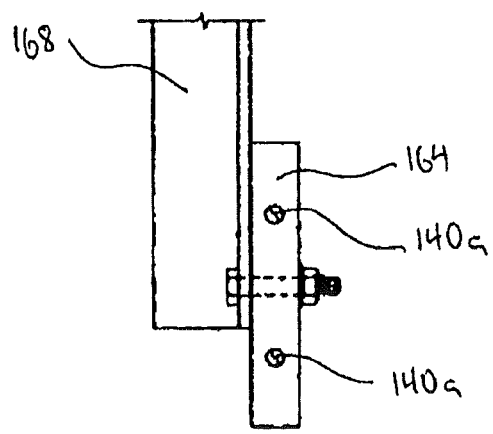

The electrochemical corrosion protection apparatus is not limited to the configuration of the embodiment described above. For example, FIGS. 2 to 4 illustrate an embodiment of an alternative anode arrangement for use with the electrochemical corrosion protection apparatus 20, generally indicated using reference numeral 140. The anode arrangement 140 consists of a set of six (6) anodes 140a to 140f that are arranged in a radial pattern in a horizontal plane inside the stainless steel process vessel 22, and which are positioned at a predetermined height above floor 22a of the stainless steel process vessel 22. Each of the anodes 140a to 140f consists of a platinum-clad niobium rod having a copper core, however it will be understood that other suitable materials and shapes may be used. As may be more clearly seen in FIGS. 4a and 4b, each of the anodes 140a to 140f is mounted to a set of insulators 164, which are suspended from a respective support 162 by angle iron 168. Supports 162 are air spargers for introducing air into the stainless steel process vessel 22 for the scrubbing process carried out therein, however it will be understood that other structures may be used for supporting the anodes. Each of the anodes 140a to 140f has a first end 170 positioned inside of the stainless steel process vessel 22 that terminates in a loop. Each of the anodes 140a to 140f also has a second end 172 mounted within the wall of process vessel 22 using an electrically insulated seal 176, and this second end 172 is coupled via an anode line (not shown) to a DC output (not shown) of a DC power supply (not shown). Each of the anodes 140a to 140f is therefore electrically insulated from the stainless steel process vessel 22 by the insulators 164 and by the insulated seal 176.

Figure 5:
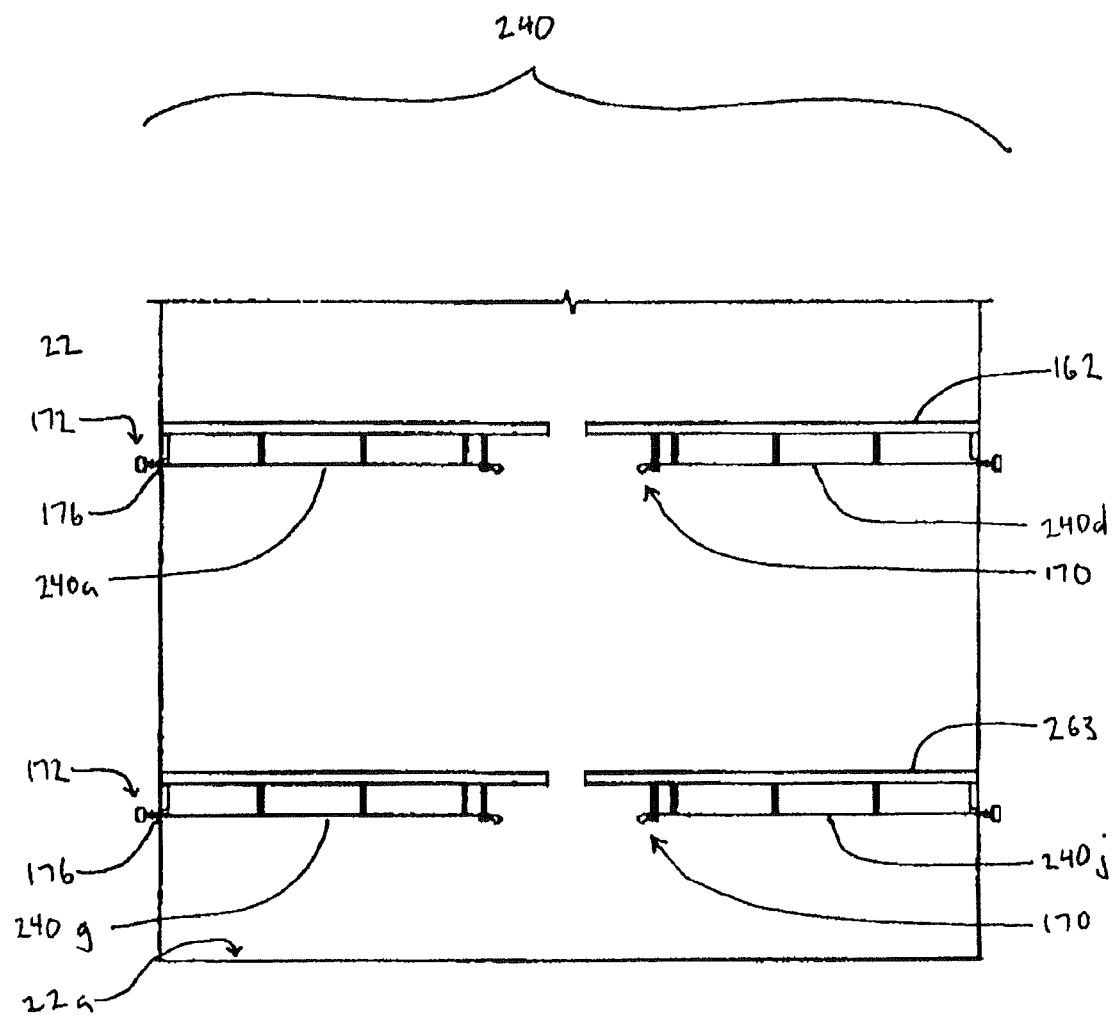
FIG. 5 is a side view of another embodiment of an anode arrangement for use with the apparatus of FIG. 1.

FIG. 5 illustrates another embodiment of an alternative anode arrangement for use with the electrochemical corrosion protection apparatus 20, generally indicated using reference numeral 240. The anode arrangement 240 consists of two sets of six (6) anodes 240a to 240f (only 240a and 240d shown) and 240g to 240l (only 240g and 240j shown), with each set being arranged in a radial pattern, similar to that shown in FIG. 3, within a respective horizontal plane inside the stainless steel process vessel 22. In this manner, the anode arrangement 240 effectively forms a multi-layered anode within the process vessel 22. Here, anodes 240a to 240f are positioned at a first predetermined height above floor 22a of the stainless steel process vessel 22, while anodes 240g to 240l are positioned at a second predetermined height above floor 22a, where anodes 240g to 240l are closer to the floor 22a than anodes 240a to 240f. Each of the anodes 240a to 240f consists of a platinum-clad niobium rod having a copper core, however it will be understood that other suitable materials and shapes may be used. Each of the anodes 240a to 240f is mounted to the set of insulators 164, which are suspended from the respective support 162. Each of the anodes 240g to 240f is mounted to the set of insulators 164, which are suspended from a respective support 263. The supports 162 are air spargers for introducing air into the stainless steel process vessel 22 for the scrubbing process carried out therein, however it will be understood that other structures may be used for supporting the anodes. Each of the anodes 240a to 240l has a first end 170 positioned inside of the stainless steel process vessel 22 that terminates in a loop. Each of the anodes 240a to 240l also has the second end 172 mounted within the wall of process vessel 22 using the electrically insulated seal 176, and this second end 172 is coupled via an anode line (not shown) to a DC output (not shown) of a DC power supply (not shown). Each of the anodes 240a to 240l is therefore electrically insulated from the stainless steel process vessel 22 by the insulators 164 and by the insulated seal 176.

As will be understood, and without being bound by theory, each set of anodes has a respective zone of influence on portions of the stainless steel process vessel 22 above and below the anode set. By properly spacing the sets of anodes 240a to 240f and 240g to 240l within the process vessel 22, the entirety or near entirety of the process vessel 22 can be brought to a passivation potential.

Figure 6:
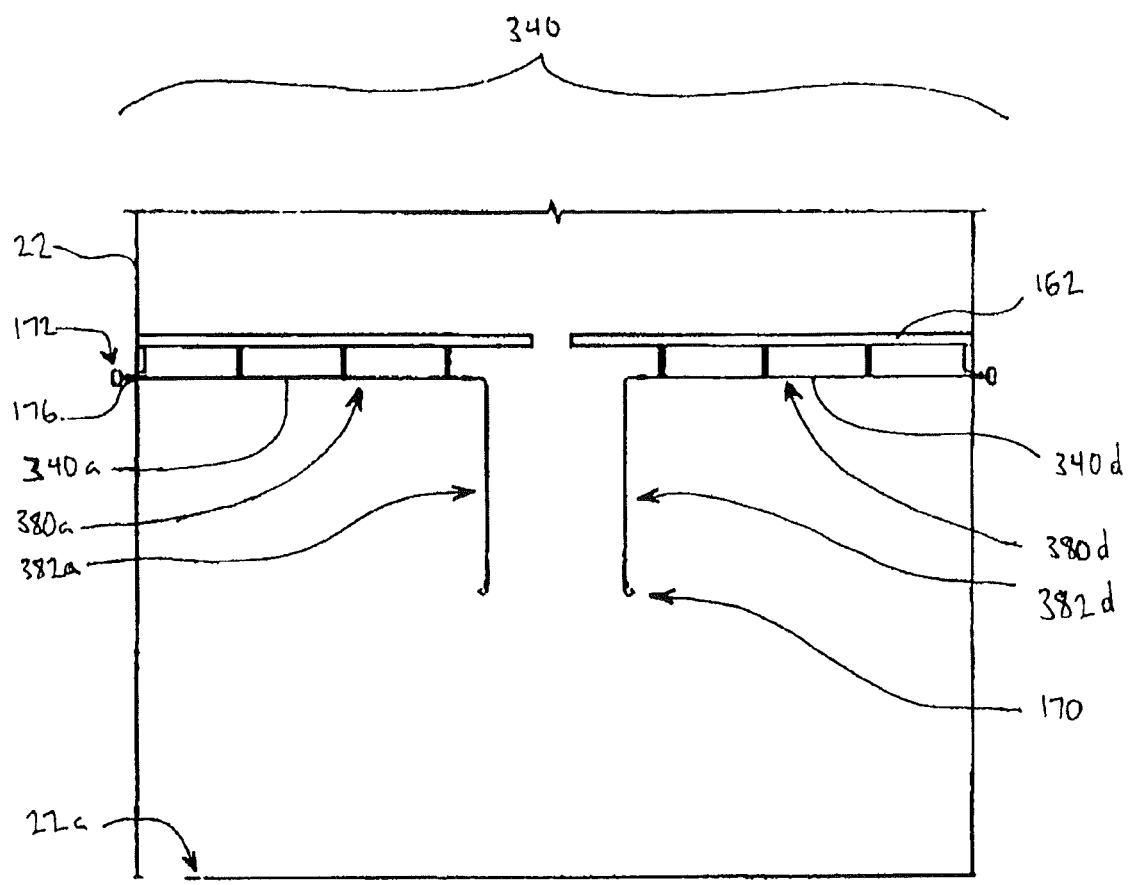
FIG. 6 is a side view of still another embodiment of an anode arrangement for use with the apparatus of FIGS. 1.

FIG. 6 illustrates still another embodiment of an alternative anode arrangement for use with the electrochemical corrosion protection apparatus 20, generally indicated using reference numeral 340. The anode arrangement 340 consists of a set of six (6) anodes 340a to 340f (only 340a and 340d shown) that are arranged in a radial pattern, similar to that shown in FIG. 3, within a horizontal plane inside the stainless steel process vessel 22, and which are positioned at a predetermined height above floor 22a of the stainless steel process vessel 22. Each of the anodes 340a to 340f consists of a platinum-clad niobium rod having a copper core, however it will be understood that other suitable materials and shapes may be used. Each of the anodes 340a to 340f comprises a respective first portion 380a to 380f mounted to a set of insulators 164, which are suspended from a respective support 162 by angle iron 168. The supports 162 are air spargers for introducing air into the stainless steel process vessel 22 for the scrubbing process carried out therein, however it will be understood that other structures may be used for supporting the anodes. Each first portion 380a to 380f is coupled to a respective second portion 382a to 382f and, in this embodiment, each first portion 380a to 380f is integral with its respective second portion 382a to 382f. Each second portion 382a to 382f is non-collinear with its respective first portion and, in this embodiment, each second portion 382a to 382f forms an angle of about 90 degrees with respect to its respective first portion 380a to 380f. In the embodiment shown, each second portion 382a to 382f is positioned generally near the center of the process vessel 22, and is generally downwardly oriented.

Each of the anodes 340a to 340f has the first end 170 positioned inside of the stainless steel process vessel 22 that terminates in a loop. Each of the anodes 340a to 340f also has the second end 172 mounted within the wall of process vessel 22 using the electrically insulated seal 176, and this second end 172 is coupled via an anode line (not shown) to a DC output (not shown) of a DC power supply (not shown). Each of the anodes 340a to 340f is therefore electrically insulated from the stainless steel process vessel 22 by the insulators 164 and by the insulated seal 176.

As will be understood, and without being bound by theory, orienting the anodes 340a to 340f such that the second portions 382a to 382f are positioned generally near the center of the process vessel 22 and are generally parallel with the walls of the process vessel 22 improves the overall current distribution between the anodes and the process vessel 22. The anode arrangement 340 thereby permits the process vessel 22 to be more readily brought to a passivation potential through more even current distribution around the process vessel 22.

Although in the embodiment described above, the second portions are generally downwardly oriented, in other embodiments, the second portions may alternatively be generally upwardly oriented or oriented in any suitable direction.

Figure 7:
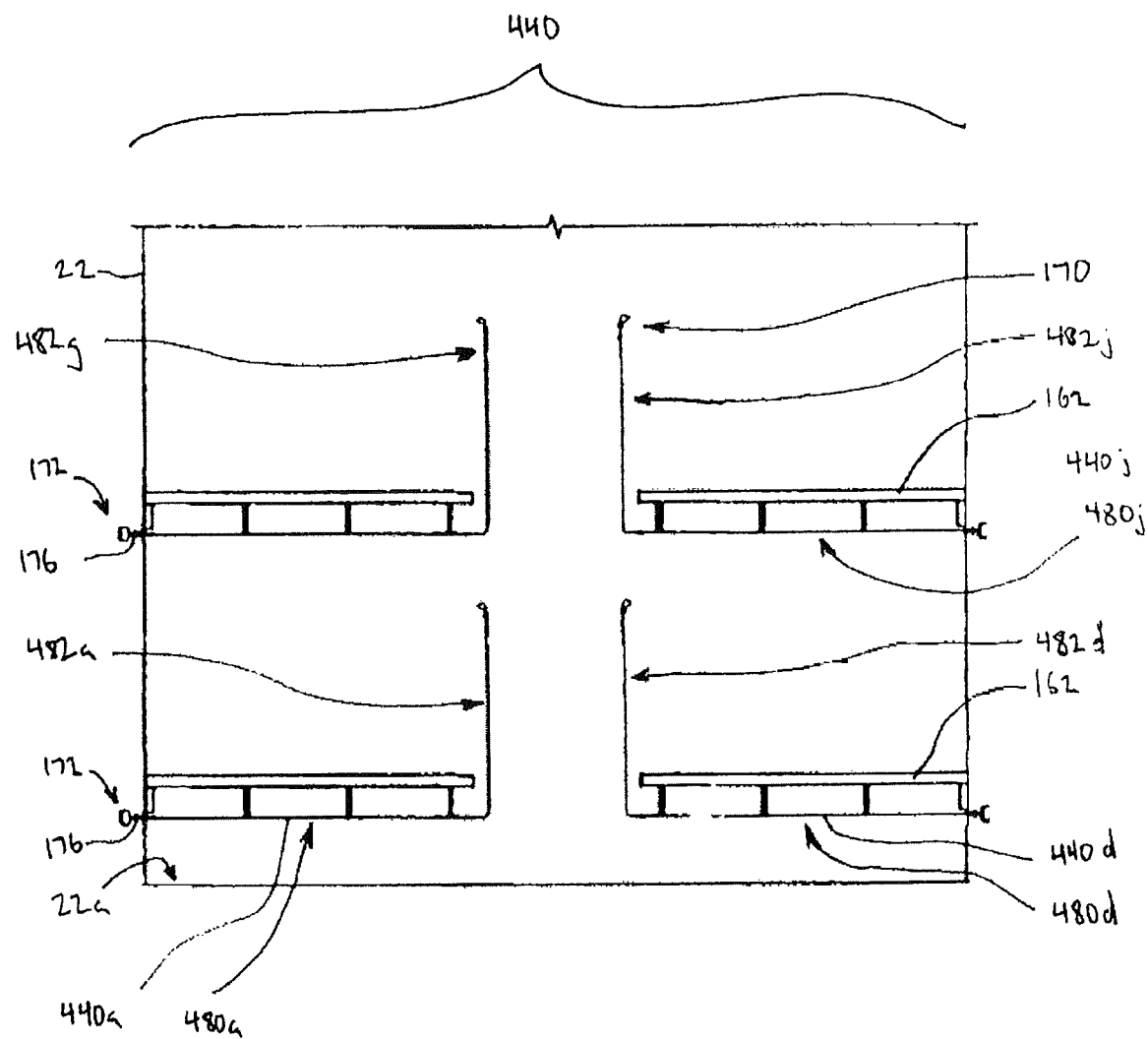
FIG. 7 is a side view of yet another embodiment of an anode arrangement for use with the apparatus of FIG. 1.

FIG. 7 illustrates still another embodiment of an alternative anode arrangement for use with the electrochemical corrosion protection apparatus 20, generally indicated using reference numeral 440. The anode arrangement 440 consists of two sets of six (6) anodes 440a to 440f (only 440a and 440d shown) and 440g to 440l (only 440g and 440j shown), with each set being arranged in a radial pattern, similar to that shown in FIG. 3, within a respective horizontal layer inside the stainless steel process vessel 22. In this manner, the anode arrangement 440 effectively forms a multi-layered anode within the process vessel 22. Here, the anodes 440a to 440f are positioned at a first predetermined height above the floor 22a of the stainless steel process vessel 22, while the anodes 440g to 440l are positioned at a second predetermined height above the floor 22a, where the anodes 440g to 440l are closer to the floor 22a than the anodes 440a to 440f. Each of the anodes 440a to 440l consists of a platinum-clad niobium rod having a copper core, however it will be understood that other suitable materials and shapes may be used. Each of the anodes 440a to 440f further comprises a respective first portion 480a to 480f mounted to the set of insulators 164, which are suspended from a respective support 162 by angle iron 168. Similarly, each of the anodes 440g to 440l comprises a respective first portion 480g to 480l mounted to the set of insulators 164, which are suspended from the respective support 162 by the angle iron 168. In this embodiment, the supports 162 are air spargers for introducing air into the stainless steel process vessel 22 for the scrubbing process carried out therein, however it will be understood that other structures may be used for supporting the anodes. Each of the first portions 480a to 480f is coupled to a respective second portion 482a to 482f, and similarly each of the first portions 480g to 480l is coupled to the respective second portion 482g to 482l. Each of the first portions 480a to 480l is integral with its respective second portion 482a to 482l. Each of the second portions 482a to 482l is non-collinear with its respective first portion and, in this embodiment, each of the second portions 482a to 482l forms an angle of about 90 degrees with respect to its respective first portion 480a to 480l. In the embodiment shown, each of the second portions 482a to 482l is positioned generally near the center of the process vessel 22, and is generally upwardly oriented.

Each of the anodes 440a to 440l has the first end 170 positioned inside of the stainless steel process vessel 22 that terminates in a loop. Each of the anodes 440a to 440l also has the second end 172 mounted within the wall of process vessel 22 using the electrically insulated seal 176, and this second end 172 is coupled via an anode line (not shown) to a DC output (not shown) of a DC power supply (not shown). Each of the anodes 440a to 440l is therefore electrically insulated from the stainless steel process vessel 22 by the insulators 164 and by the insulated seal 176.

Similar to the anode arrangement 340 described above, and without being bound by theory, orienting the anodes 440a to 440l such that the second portions 482a to 482l are positioned generally near the center of the process vessel 22 and are generally parallel with the walls of the process vessel 22 improves the overall current distribution between the anodes and the process vessel 22. The anode arrangement 440 thereby permits the process vessel 22 to be more readily brought to a passivation potential through more even current distribution around the process vessel 22.

Although in the embodiments described above, the second portions are generally upwardly oriented, in other embodiments, the second portions may alternatively be generally downwardly oriented or may be oriented in any suitable direction. Additionally, although in the embodiment described above, the anode arrangement is for use with an electrochemical corrosion protection apparatus that is configured to provide electrochemical corrosion protection to a stainless steel process vessel, in other embodiments, the anode arrangement may alternatively be used with a corrosion protection apparatus configured to provide electrochemical corrosion protection to a process vessel fabricated of one or more other materials (e.g. metal(s) or metal alloy(s)).

The anode arrangements are not limited to those described above. For example, in other embodiments, the anode arrangement may alternatively comprise any number of anodes. Additionally, in other embodiments, the anode arrangement may comprise one or more anodes arranged in any way, such as for example in a different pattern within a horizontal plane, in a vertical plane, or in a plane of any orientation, and in any number of planes. Additionally, each of the anodes may be oriented in any direction within the process vessel, such as in a horizontal direction, in a vertical direction, in a diagonal direction, etc.

The electrochemical corrosion protection apparatus of the embodiments described above is not limited to use with stainless steel process vessels fabricated of duplex stainless steels, and in other embodiments may alternatively be used with any process vessels fabricated of other metal(s) or metal alloy(s). In certain embodiments, other stainless steels, such as superaustenitic stainless steel, may be used. As is known in the art, superaustenitic stainless steels have higher molybdenum, nitrogen, and nickel contents, which together increase the resistance to pitting, crevice corrosion, and stress-corrosion cracking, as compared to standard "300 series" austenitic stainless steels. Two examples of superaustenitic stainless steels are AL-6XN™, which has UNS designation N08367, and 254SMO stainless steel. However, other grades of superaustenitic stainless steels are available. In still other embodiments, the apparatus may be used with a process vessel fabricated of more than one kind of stainless steel, and which may include both a duplex stainless steel and a superaustenitic stainless steel.

Although in embodiments described above, each of the anodes comprises a respective first portion, and each first portion is coupled to a respective second portion, it will be understood that the anodes are not limited to two (2) portions, and in other embodiments, each anode may alternatively comprise any number of portions.

Although embodiments described above are directed to a stainless steel process vessel that is a scrubber vessel, in other embodiments, the stainless steel process vessel may be any process vessel that forms part of a scrubber system. For example, in a related embodiment, the stainless steel process vessel may be a reaction tank of a scrubber system. Similarly, the apparatuses and methods described above are not limited to use with the scrubber systems described above, and may alternatively be used with scrubber systems having other configurations and/or other kinds of process vessels not mentioned above. It will also be understood that the apparatuses and methods described above are not limited to use with scrubber vessels, and alternatively may be used to provide electrochemical corrosion protection to any process vessel, such as, and without being limited thereto, a fluid tank, a reactor, a reaction tank, a pipe, a pipeline, and the like.

Although in embodiments described above, each anode is supported by a respective air sparger, in other embodiments, each anode may alternatively be supported by any structure in the process vessel capable of supporting one or more anodes.

Although in embodiments described above the anode or anodes are described as being positioned in the interior of the process vessel, in other embodiments, the anode or anodes may alternatively be positioned anywhere with respect to the process vessel provided that the anode or anodes, the process fluids, and the process vessel are able to function as an electrochemical cell, and therefore provided that the anode or anodes are in communication with the process vessel. For example, the anode or anodes may alternatively be positioned within any of an input or an output of the process vessel.

Similarly, although it has been described above that the reference electrode is positioned in the interior of the process vessel, in other embodiments, the reference electrode may alternatively be positioned anywhere with respect to the process vessel provided the reference electrode, the process fluids, and the process vessel are able to function as an electrochemical cell, and therefore provided that the reference electrode is in communication with the process vessel. For example, the reference electrode may alternatively be positioned within any of an input or an output of the process vessel.

Although the potential control unit has been described as being in communication with the DC power supply, this communication is not limited to any specific configuration and may include, for example, any of a wired and a wireless connection between the potential control unit and the DC power supply. Additionally, the DC power supply and the potential control unit may be structurally integrated with each other, or they may be structurally separate from each other.

Although it has been described that the potential control unit has a user input that allows a user to enter the target value of potential, in other embodiments, the target value of potential may alternatively be predefined and/or fixed. Additionally, those of skill in the art will understand that still other configurations are possible with respect to the target value of potential.

Although embodiments have been described above with reference to the accompanying drawings, those of skill in the art will appreciate that variations and modifications may be made without departing from the spirit and scope thereof as defined by the appended claims.

What is claimed is:

1. An apparatus for providing electrochemical corrosion protection to a stainless steel process vessel, the apparatus comprising:
    at least one anode in communication with the process vessel;
    a reference electrode in communication with the process vessel;
    a DC current supply electrically coupled to the process vessel and to the at least one anode; and
    a potential control unit electrically coupled to the process vessel and to the reference electrode,
    wherein the DC current supply is configured to supply a passivation current to the at least one anode,
    wherein the potential control unit is in communication with the DC current supply and is configured to adjust the passivation current supplied by the DC current supply,
    wherein the process vessel forms part of a scrubber system, and
    wherein the process vessel comprises at least one of duplex stainless steel and superaustenitic stainless steel.

2. The apparatus of claim 1, wherein the process vessel consists essentially of at least one of duplex stainless steel and superaustenitic stainless steel.

3. The apparatus of claim 1, wherein the potential control unit is configured to adjust the passivation current supplied by the DC current supply based upon an electrochemical potential sensed by the reference electrode.

4. The apparatus of claim 3, wherein the scrubber system is a flue gas desulphurization scrubber system.

5. The apparatus of claim 1, wherein the potential control unit is configured to adjust the passivation current supplied by the DC current supply so as to bring the process vessel to a passivation potential in the range of about −850 mV to about +500 mV relative to the reference electrode.

6. The apparatus of claim 1, wherein the potential control unit is configured to adjust the passivation current supplied by the DC current supply so as to bring the process vessel to a passivation potential in the range of about −350 mV to about +400 mV relative to the reference electrode.

7. The apparatus of claim 1, wherein said at least one anode comprises a plurality of anodes, wherein said plurality of anodes comprises at least one anode positioned at a first height above a floor of the process vessel and at least one anode positioned at a second height above the floor of the process vessel.

8. The apparatus of claim 1, wherein said at least one anode is positioned in an interior of the process vessel and is inclined relative to a wall of the process vessel.

9. A method of providing electrochemical corrosion protection to a stainless steel process vessel, the method comprising:
supplying a passivation current to at least one anode in communication with the process vessel, wherein the passivation current is supplied by a DC current supply that is electrically coupled to the process vessel and to the at least one anode, and
adjusting the passivation current so as to apply a passivation potential to the process vessel, wherein the current is adjusted by a potential control unit that is electrically coupled to the process vessel and to a reference electrode in communication with the process vessel;
wherein the process vessel comprises at least one of duplex stainless steel and superaustenitic stainless steel, and
wherein the process vessel forms part of a scrubber system.

10. The method of claim 9, wherein the passivation current is adjusted based upon an electrochemical potential sensed by the reference electrode.

11. The method of claim 10, wherein the electrochemical potential sensed by the reference electrode is an electrochemical potential existing in an electrochemical system comprising the process vessel, the reference electrode and a process fluid contained within the process vessel.

12. The method of claim 9, wherein the passivation potential is in the range of about −850 mV to about +500 mV relative to the reference electrode.

13. The method of claim 9, wherein the passivation potential is the range of about −350 mV to about +400 mV relative to the reference electrode.

14. The method of claim 9, wherein said at least one anode comprises a plurality of anodes, and wherein said method further comprises positioning at least one of said plurality of anodes at a first height above a floor of the process vessel and positioning at least one of said plurality of anodes at a second height above the floor of the process vessel.

15. The method of claim 9, wherein said method further comprises positioning the at least one anode in an interior of the process vessel and inclining the at least one anode relative to a wall of the process vessel.

16. An apparatus for providing electrochemical corrosion protection to a process vessel, the apparatus comprising:
at least one anode in communication with the process vessel;
a reference electrode in communication with the process vessel;
a DC current supply electrically coupled to the process vessel and to the at least one anode; and
a potential control unit electrically coupled to the process vessel and to the reference electrode,
wherein each anode comprises a first portion and a second portion,
wherein the DC current supply is configured to supply a passivation current to the at least one anode,
wherein the potential control unit is in communication with the DC current supply and is configured to adjust the passivation current supplied by the DC current supply, and
wherein the process vessel forms part of a scrubber system.

17. The apparatus of claim 16, wherein the process vessel comprises at least one of duplex stainless steel and superaustenitic stainless steel.

18. The apparatus of claim 16, wherein the first portion is integral with the second portion.

19. The apparatus of claim 16, wherein the second portion is non-collinear with the first portion.

20. The apparatus of claim 19, wherein the second portion forms an angle of about 90 degrees with respect to the first portion.

21. The apparatus of claim 16, wherein the potential control unit is configured to adjust the passivation current supplied by the DC current supply based upon an electrochemical potential sensed by the reference electrode.

22. The apparatus of claim 16, wherein the potential control unit is configured to adjust the passivation current supplied by the DC current supply so as to bring the process vessel to a passivation potential in the range of about −850 mV to about +500 mV relative to the reference electrode.

23. The apparatus of claim 16, wherein the potential control unit is configured to adjust the passivation current supplied by the DC current supply so as to bring the process vessel to a passivation potential in the range of about −350 mV to about +400 mV relative to the reference electrode.

24. The apparatus of claim 16, wherein said at least one anode comprises a plurality of anodes, said plurality comprising at least one anode positioned at a first height above a floor of the process vessel and at least one anode positioned at a second height above the floor of the process vessel.

25. A method of providing electrochemical corrosion protection to a process vessel, the method comprising:
supplying a passivation current to at least one anode in communication with the process vessel, wherein the passivation current is supplied by a DC current supply that is electrically coupled to the process vessel and to the at least one anode, and
adjusting the passivation current so as to apply a passivation potential to the process vessel, wherein the passivation current is adjusted by a potential control unit that is electrically coupled to the process vessel and to a reference electrode in communication with the process vessel,
wherein each anode comprises a first portion and a second portion, and
wherein the process vessel forms part of a scrubber system.

26. The method of claim 25, wherein the passivation current is adjusted based upon an electrochemical potential sensed by the reference electrode.

27. The method of claim 26, wherein the electrochemical potential sensed by the reference electrode is an electrochemical potential existing in an electrochemical system comprising the process vessel, the reference electrode and a process fluid contained within the process vessel.

28. The method of claim 26, wherein the electrochemical potential sensed by the reference electrode is an electrochemical potential existing an electrochemical system comprising the process vessel, the reference electrode and a flue gas.

29. The method of claim 28, wherein the flue gas comprises sulphur dioxide.

30. The method of claim 25, wherein the scrubber system is a flue gas desulphurization scrubber system.

31. The method of claim 25, wherein the passivation potential is in the range of about −850 mV to about +500 mV relative to the reference electrode.

32. The method of claim 25, wherein the passivation potential is in the range of about −350 mV to about +400 mV relative to the reference electrode.

33. The method of claim 25, wherein said at least one anode comprises a plurality of anodes, and wherein method further comprises positioning at least one of said plurality of anodes at a first height above a floor of the process vessel and positioning at least one of said plurality of anodes at a second height above the floor of the process vessel.

* * * * *